United States Patent
Han et al.

(10) Patent No.: US 11,783,031 B1
(45) Date of Patent: Oct. 10, 2023

(54) SYSTEMS AND METHODS FOR UTILIZING FEDERATED MACHINE-LEARNING TO PROTECT AGAINST POTENTIALLY MALICIOUS DATA

(71) Applicant: GEN DIGITAL INC., Tempe, AZ (US)

(72) Inventors: Yufei Han, Antibes (FR); Lella Bilge, Antibes (FR); Chris Gates, Mountain View, CA (US)

(73) Assignee: GEN DIGITAL INC., Tempe, AZ (US)

( * ) Notice: Subject to any disclaimer, the term of this patent is extended or adjusted under 35 U.S.C. 154(b) by 345 days.

(21) Appl. No.: 16/836,791

(22) Filed: Mar. 31, 2020

(51) Int. Cl.
 *G06F 21/55* (2013.01)
 *G06N 3/08* (2023.01)

(52) U.S. Cl.
 CPC ............ *G06F 21/554* (2013.01); *G06N 3/08* (2013.01); *G06F 2221/034* (2013.01)

(58) Field of Classification Search
 CPC .... G06F 21/554; G06F 2221/034; G06N 3/08
 See application file for complete search history.

(56) References Cited

U.S. PATENT DOCUMENTS

| 5,870,728 | A  | * | 2/1999 | Yatsuzuka | G06N 3/08 706/16 |
|---|---|---|---|---|---|
| 10,713,321 | B1 | * | 7/2020 | Wen | G06N 20/20 |
| 10,977,518 | B1 | * | 4/2021 | Sharma | G06V 10/774 |
| 11,227,050 | B1 | * | 1/2022 | Gates | G06F 21/56 |
| 11,232,255 | B2 | * | 1/2022 | Dernoncourt | G06F 40/169 |
| 11,250,433 | B2 | * | 2/2022 | Marcjan | G06N 20/00 |
| 2019/0042953 | A1 | * | 2/2019 | Duesterwald | G06F 18/214 |

OTHER PUBLICATIONS

Wang Yizhen: "Robust Machine Learning in Adversarial Setting with Provable Guarantee", 2020, 24 pages. (Year: 2020).*
Alfeld et al., "Data Poisoning Attacks against Autoregressive Models", Proceedings of the 13th AAAI Conference on Artificial Intelligence, 2016, pp. 1452-1458.
Balbach, Frank J., "Measuring teachability using variants of the teaching dimension", Science Direct, Theoretical Computer Science, vol. 397, 2008, pp. 94-113.

(Continued)

*Primary Examiner* — Yonas A Bayou
(74) *Attorney, Agent, or Firm* — Greenberg Traurig, LLP (57) ABSTRACT

The disclosed computer-implemented method for utilizing federated machine-learning to protect against potentially malicious data may include (i) arranging a set of client devices into groups for applying a federated machine-learning model, (ii) determining model updates for each of the groups over a predetermined period, (iii) training one or more recurrent neural networks to derive a low-dimensional representation of the model updates, (iv) calculating a data quality score for each of the client devices based on the model updates, (v) applying the federated machine-learning model to classify data instances on each of the client devices as including clean data or potentially corrupt data, and (vi) performing a security action that protects against the potentially malicious data by tagging the data instances classified as the potentially corrupt data. Various other methods, systems, and computer-readable media are also disclosed.

20 Claims, 7 Drawing Sheets

(56) References Cited

OTHER PUBLICATIONS

Bhagoji et al., "Analyzing Federated Learning through an Adversarial Lens", 2018, 10 pages.

Bootkrajang et al., "Label-noise Robust Logistic Regression and Its Applications", Machine Learning and Knowledge Discovery in Databases, LNCS, vol. 7523, 2012, 16 pages.

Brodley et al., "Identifying Mislabeled Training Data", Journal of Artificial Intelligence Research, vol. 11, No. 1, 1999, pp. 131-167.

Feng et al., "Robust Logistic Regression and Classification", Proceedings of the 27th International Conference on Neural Information Processing Systems, vol. 1, 2014, pp. 1-9.

Gervini et al., "A Class of Robust and Fully Efficient Regression Estimators", The Annals of Statistics, vol. 30, No. 2, 2002, pp. 583-616.

Goldman et al., "On the Complexity of Teaching", Journal of Computer and System Sciences, vol. 50, No. 1, 1995, pp. 20-31.

Haug et al., "Teaching Inverse Reinforcement Learners via Features and Demonstrations", Proceedings of the 32nd International Conference on Neural Information Processing Systems, 2018, pp. 1-13.

Jaggi et al., "Communication-Efficient Distributed Dual Coordinate Ascent", Communication-Efficient Distributed Dual Coordinate Ascent, 2014, pp. 1-15.

Konečný et al., "Federated Learning: Strategies for Improving Communication Efficiency", NIPS Workshop on Private Multi-Party Machine Learning, 2016, pp. 1-10.

\* cited by examiner

SYSTEMS AND METHODS FOR UTILIZING FEDERATED MACHINE-LEARNING TO PROTECT AGAINST POTENTIALLY MALICIOUS DATA

BACKGROUND

Federated machine-learning may often be utilized to obtain distributed data analytics for data stored on enterprise and consumer computing devices in a network. For example, rich data (e.g., images, text messages, log entries, security incident data, etc.) from various local hosting devices may be utilized to train a federated machine-learning model for various applications requiring data stored on multiple devices (e.g., the sharing of large healthcare data sets, computer vision automation processes, etc.).

Traditional federated machine-learning models, however, may often suffer from a number of drawbacks. For example, in practice, the model training process utilized by traditional federated machine-learning is often vulnerable to missing data and/or intentional or unintentional data corruption as a result of customized data privacy policies applied to local data sets (e.g., many consumer or enterprise devices may choose to implement rights to forget/encrypt sensitive data). Additionally, the training data utilized by traditional federated machine-learning models may suffer from various unexpected data corruptions such as adversarial data poisoning and random data corruption (e.g., due to sensor failures). Moreover, the process of manually identifying corrupted data instances in training data may often be expensive and/or time consuming for device owners.

SUMMARY

As will be described in greater detail below, the present disclosure describes various systems and methods for utilizing federated machine-learning to protect against potentially malicious data.

In one example, a method for utilizing federated machine-learning to protect against potentially malicious data may include (i) arranging a set of client devices into groups for applying a federated machine-learning model, (ii) determining model updates for each of the groups over a predetermined period, training one or more recurrent neural networks to derive a low-dimensional representation of the model updates, calculating a data quality score for each of the client devices based on the model updates, applying the federated machine-learning model to classify data instances on each of the client devices as clean data or potentially corrupt data, and performing a security action that protects against the potentially malicious data by tagging the data instances classified as potentially corrupt data.

In some examples, the data quality score may be calculated by determining a probabilistic score representing a data quality measurement for each of the client devices. In some embodiments, the data quality measurement may represent a high data quality when the probabilistic score is determined to have a high value. In other embodiments, the data quality measurement may represent a low data quality when the probabilistic score is determined to have a low value. In some examples, the data quality measurement may be evaluated for each of the client devices and the model updates may be corrected by a reweighed average.

In some examples, the federated machine-learning model may be applied to determine a classification margin value for each of the data instances with respect to a classification boundary. In some embodiments, a high classification margin value may be associated with a low likelihood of a target data instance containing the potentially corrupt data and a low classification margin value may be associated with a high likelihood of a target data instance containing the potentially corrupt data. In some examples, each of the data instances may be a training instance for the federated machine-learning model.

In one embodiment, a system for utilizing federated machine-learning to protect against potentially malicious data may include at least one physical processor and physical memory that includes a group of modules and computer-executable instructions that, when executed by the physical processor, cause the physical processor to (i) arrange, by a grouping module, a set of client devices into groups for applying a federated machine-learning model, (ii) determine, by a determining module, model updates for each of the groups over a predetermined period, (iii) train, by a training module, one or more recurrent neural networks to derive a low-dimensional representation of the model updates, (iv) calculate, by a scoring module, a data quality score for each of the client devices based on the model updates, (v) apply, by a classification module, the federated machine-learning model to classify data instances on each of the client devices as including clean data or potentially corrupt data, and (vi) perform, by a security module, a security action that protects against the potentially malicious data by tagging the data instances classified as the potentially corrupt data.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) arrange a set of client devices into groups for applying a federated machine-learning model, (ii) determine model updates for each of the groups over a predetermined period, (iii) train one or more recurrent neural networks to derive a low-dimensional representation of the model updates, (iv) calculate a data quality score for each of the client devices based on the model updates, (v) apply the federated machine-learning model to classify data instances on each of the client devices as including clean data or potentially corrupt data, and (vi) perform a security action that protects against the potentially malicious data by tagging the data instances classified as the potentially corrupt data.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing federated machine-learning to protect against potentially malicious data. As will be described in greater detail below, the systems and methods described herein may provide a framework for the automatic data quality assessment of local data sets hosted on client computing devices. The automatic data quality assessment may include: (1) a device-level quality assessment (as a device quality score) by evaluating the quality of a data set provided by any client computing device and adjusting the weight of the local data sets for training a federated machine-learning model and (2) instance-level data debugging (as an instance quality score) by flagging potentially corrupt data instances hosted on client computing devices. By providing the automatic data quality assessment in this way, the federated training of machine-learning based analytical models may be made robust against local data corruption on client computing devices. In addition, the systems and methods described herein may improve the security of a computing device by tagging potentially corrupt data instances containing malicious data.

Figure 1:
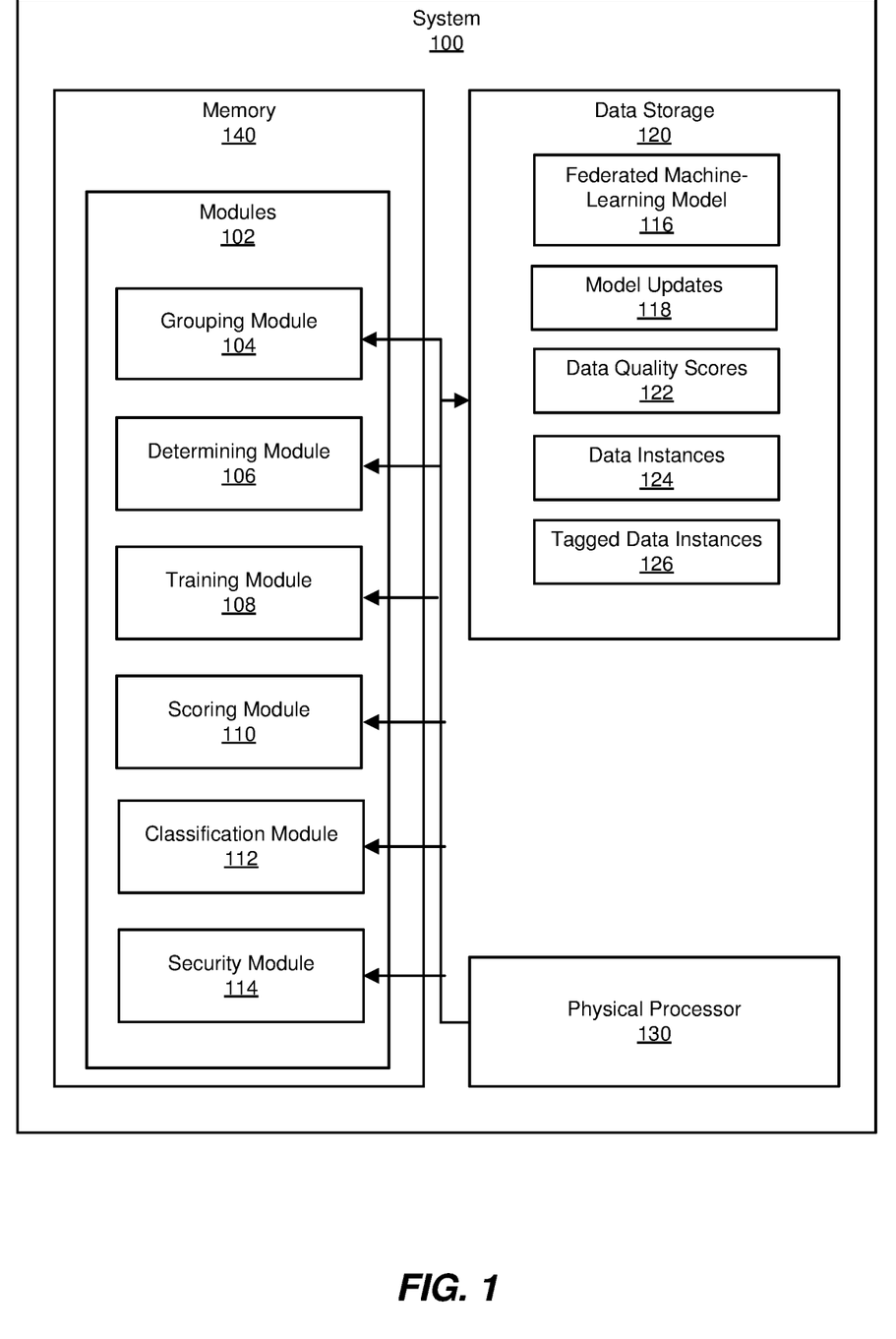
FIG. 1 is a block diagram of an example system for utilizing federated machine-learning to protect against potentially malicious data.
Figure 2:
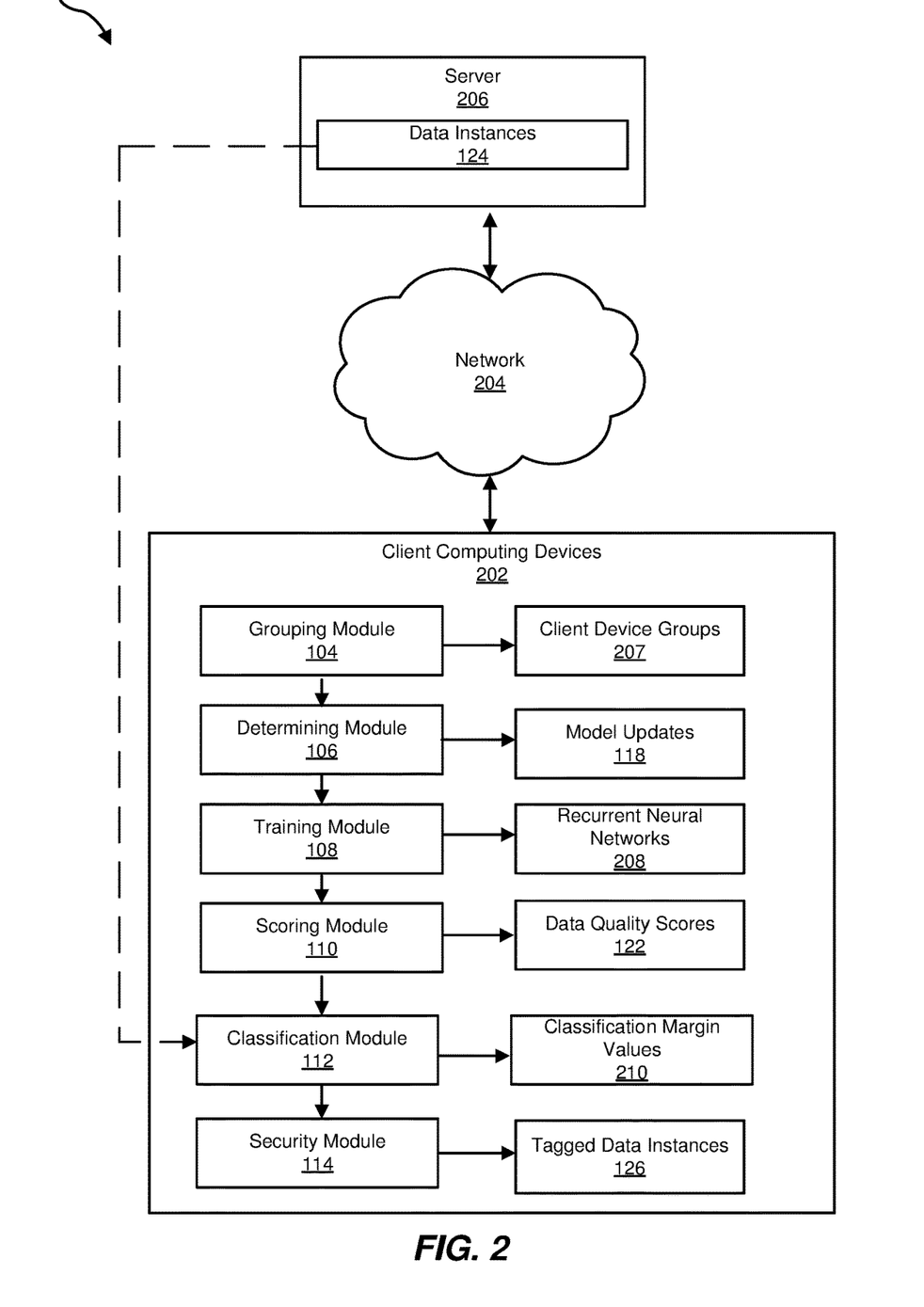
FIG. 2 is a block diagram of an additional example system for utilizing federated machine-learning to protect against potentially malicious data.

The following will provide, with reference to FIGS. 1-2, detailed descriptions of example systems for utilizing federated machine-learning to protect against potentially malicious data. Detailed descriptions of corresponding computer-implemented methods will also be provided in connection with FIG. 3. A detailed description of various sequential model updates that may be performed by the example systems of FIGS. 1 and 2 will also be provided in connection with FIG. 4. A detailed description of a classification boundary to identify potentially corrupt data instances, that may be utilized by the example systems of FIGS. 1 and 2, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing federated machine-learning to protect against potentially malicious data. As illustrated in this figure, example system 100 may include one or more modules 102 for performing one or more tasks. For example, and as will be explained in greater detail below, example system 100 may include a grouping module 104 that arranges client devices into groups for applying a federated machine-learning model 116. Example system 100 may additionally include a determining module 106 that determines model updates 118 for each of the client device groups over a predetermined period. Example system 100 may also include a training module 108 that trains one or more recurrent neural networks to derive a low-dimensional representation of model updates 118. Example system 100 may additionally include a scoring module 110 that calculates a data quality score 122 for each of the client devices based on model updates 118. Example system 100 may also include a classification module 112 that applies federated machine-learning model 116 to classify data instances 124 on each of the client devices as including clean data or potentially corrupt data. Example system 100 may additionally include a security module 112 that performs a security action that protects against potentially malicious data by tagging data instances 124 (i.e., tagged data instances 126) classified as the potentially corrupt data. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., client computing devices 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing federated machine-learning to protect against potentially malicious data. Examples of physical processor 130 include, without limitation, microprocessors, microcontrollers, Central Processing Units (CPUs), Field- Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store federated machine-learning model 116, model updates 118, data quality scores 122, data instances 124, and tagged data instances 126.

Example system 100 in FIG. 1 may be implemented in a variety of ways. For example, all or a portion of example system 100 may represent portions of example system 200 in FIG. 2. As shown in FIG. 2, system 200 may include client computing devices 202 in communication with a server 206 via a network 204. In one example, all or a portion of the functionality of modules 102 may be performed by a client computing device 202 and/or any other suitable computing system. As will be described in greater detail below, one or more of modules 102 from FIG. 1 may, when executed by at least one processor of a client computing device 202, enable a client computing device 202 to utilize federated machine-learning to protect against potentially malicious data.

For example, grouping module 104 may arrange a set of client devices into client device groups 207. Then, determining module 106 may determine model updates 118 for client device groups 207 over a predetermined period. Next, training module 108 may train one or more recurrent neural networks 208 to derive a low-dimensional representation of model updates 118. Then, scoring module 110 may calculate data quality scores 122 for the client devices in client device groups 207. Next, classification module 112 may apply federated machine-learning model 116 to classify data instances 124 for the client devices in client device groups 207 as either clean data or potentially corrupt data. Finally, security module 114 may perform a security action that protects against potentially malicious data by tagging data instances 124, classified as the potentially corrupt data, as tagged data instances 126.

Client computing devices 202 generally represent any type or form of computing device capable of reading computer-executable instructions. In some embodiments, client computing devices 202 may represent a number of client endpoint devices configured for storing and updating federated machine-learning models. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of storing data instances utilized in training one or more federated machine-learning models on client computing devices. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between client computing devices 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
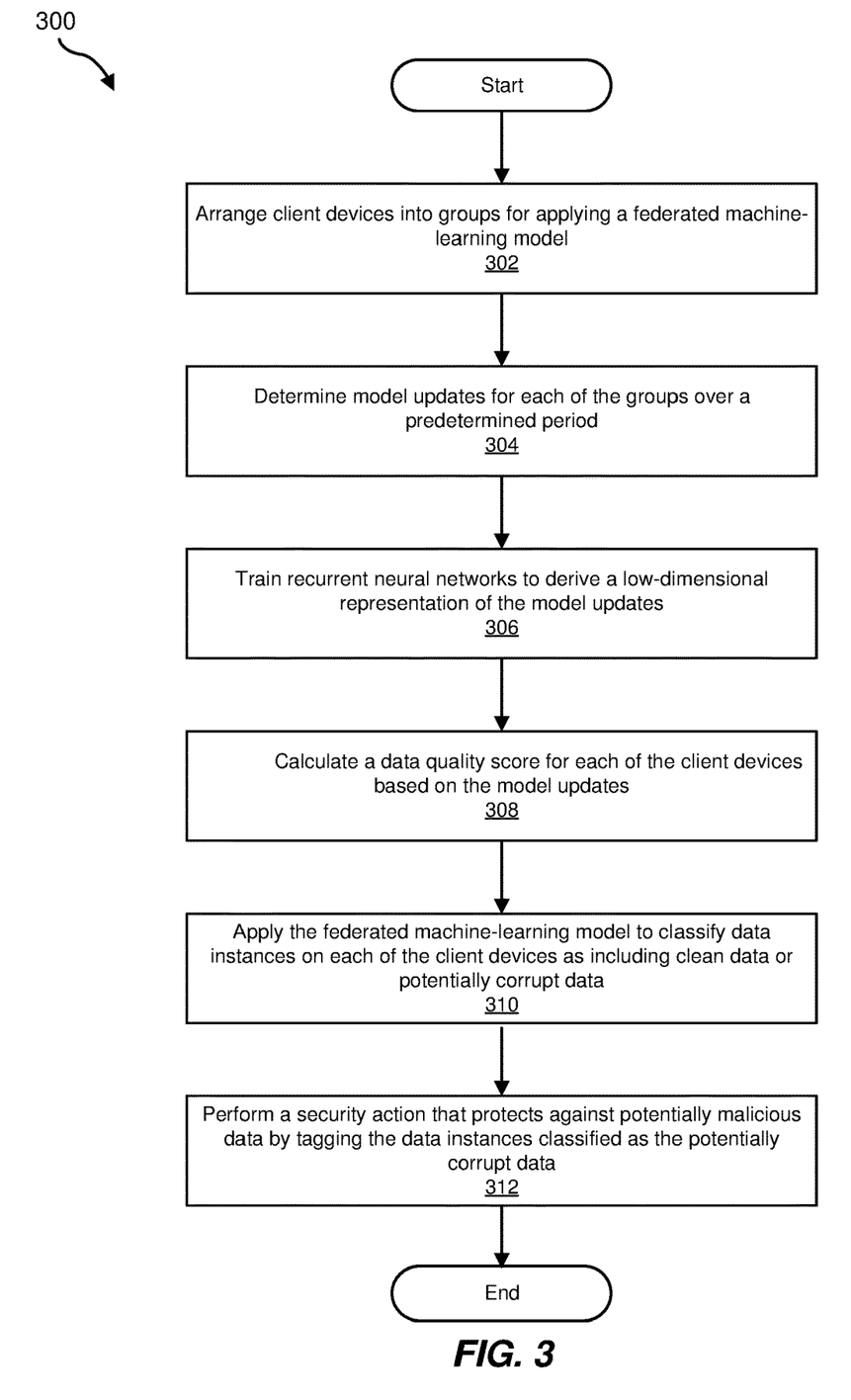
FIG. 3 is a flow diagram of an example method for utilizing federated machine-learning to protect against potentially malicious data.

FIG. 3 is a flow diagram of an example computer-implemented method 300 for utilizing federated machine-learning to protect against potentially malicious data. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may arrange client devices into groups for applying a federated machine-learning model. For example, grouping module 104 may, as part of client computing devices 202 in FIG. 2, arrange a set of client devices into client device groups 207 for applying federated machine-learning model 116.

Grouping module 104 may arrange the client devices into client device groups 207 in a variety of ways. In some embodiments, grouping module 104 may randomly group different sets client devices into multiple groups and then apply federated machine-learning to each group. For example, a first group of client devices may contain a laptop computer and a tablet computing device, a second group of client devices may contain a wearable computing device (e.g., a smartwatch), and a third group of client devices may contain a smartphone and a mobile storage device.

At step 304, one or more of the systems described herein may determine model updates for each of the groups over a predetermined period. For example, determining module 106 may, as part of client computing devices 202 in FIG. 2, determine model updates 118 for client device groups 207 over a predetermined period.

Determining module 106 may determine model updates 118 in a variety of ways. For example, determining module 106 may calculate averaged model updates 118 at each of multiple time steps for each client device group 207.

At step 306, one or more of the systems described herein may train recurrent neural networks to derive a low-dimensional representation of the model updates. For example, training module 108 may, as part of client computing devices 202 in FIG. 2, train one or more recurrent neural networks 208 to derive a low-dimensional representation of model updates 118. In some examples, recurrent neural networks 208 may include a Long short-term memory (LSTM) artificial recurrent neural network (RNN) architecture. LSTM networks may often be utilized in classifying, processing and making predictions based on time series data.

Training module 108 may train recurrent neural networks 208 in a variety of ways. For example, training module 108, for any given client device in client device groups 207, may be utilized to project a model update 118 (e.g., a sequential model update) to a low-dimensional representation with an RNN/LSTM model.

At step 308, one or more of the systems described herein may calculate a data quality score for each of the client devices based on the model updates. For example, scoring module 110 may, as part of client computing devices 202 in FIG. 2, calculate a data quality score 122 for each of the client devices in client device groups 207, based on model updates 118.

Scoring module 110 may calculate data quality scores 122 in a variety of ways. For example, in some embodiments, scoring module 110 may determine a probabilistic score including a data quality measurement for each of the client devices. In this example, the data quality measurement represents a high data quality when the probabilistic score is determined to have a high value and the data quality measurement represents a low data quality when the probabilistic score is determined to have a low value. In some embodiments the probabilistic score may be determined by estimating a probability distribution module with a kernel density estimator (KDE). In some examples, scoring module 110 may further be utilized to evaluate the data quality measurement for each of the client devices and correct model updates 118 by a reweighed average.

At step 310, one or more of the systems described herein may apply the federated machine-learning model to classify data instances on each of the client devices as including clean data or potentially corrupt data. For example, classification module 112 may, as part of client computing devices 202 in FIG. 2, apply federated machine-learning model 116 to classify data instances 124 on each of the client devices in client device groups 207 as including clean data or potentially corrupt data.

The term "corrupt data," as used herein, generally refers to any data (e.g., noisy data) that may negatively affect the training of federated machine-learning data including, without limitation, user-masked (e.g., encrypted) data, mis-ordered data, and outlier data. For example, outlier data may include data instances that have been poisoned by attackers intended to damage a federated machine-learning model that relies on receiving clean data instances for training.

Classification module 112 may apply federated machine-learning model 116 to classify data instances 124 in a variety of ways. For example, classification module 112 may be utilized to determine a classification margin value for each data instance 124 with respect to a classification boundary. According to this example, a low classification margin value may be associated with a high likelihood of a data instance 124 containing potentially corrupt data and a high classification margin value is associated with a low likelihood of a data instance 124 containing potentially corrupt data (i.e., a data instance 124 is likely to contain clean or noise free data). In some embodiments, classification module 112 may further be configured to assign an instance quality score based on the classification margin value for a given data instance 124. For example, a data instance 124 having a high or large classification margin value is easier to be classified (and thus likely to contain noise-free data) and thus would be assigned a high instance quality score. Conversely, a data instance 124 having a low or small classification margin value is more difficult to be classified (and thus likely to contain noisy data) and thus would be assigned a low instance quality score.

At step 312, one or more of the systems described herein may perform a security action that protects against potentially malicious data by tagging the data instances classified as the potentially corrupt data. For example, security module 114 may, as part of client computing devices 202 in FIG. 2, tag those data instances 124 that have been classified as containing potentially corrupt data (i.e., target data instances) as tagged data instances 126.

Security module 114 may tag the target data instances as tagged data instances 126 in a variety of ways. For example, a tagged data instance 126 may include a label generated by security module 114 that identifies a tagged data instance 126 as containing potentially corrupt data.

Figure 4:
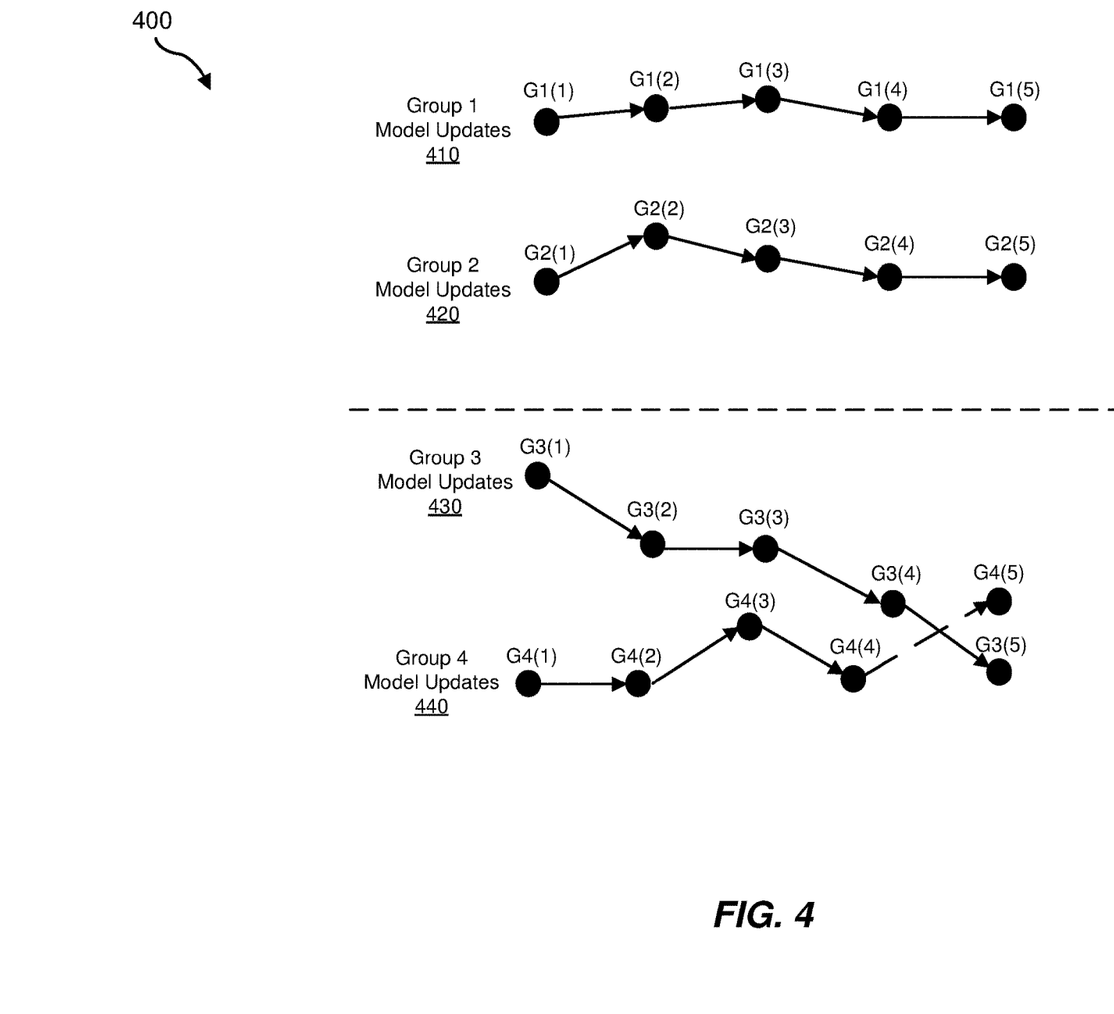
FIG. 4 is a diagram illustrating various sequential model updates that may be performed by the example systems of FIGS. 1 and 2.

FIG. 4 is a diagram illustrating various sequential model updates 400 that may be performed by the example systems of FIGS. 1 and 2. The sequential model updates 400 may include Group 1 Model Updates 410, Group 2 Model Updates 420, Group 3 Model Updates 430, and Group 4 Model Updates 440. Each of the Model Updates 410-440 may represent updates of a federated machine-learning model utilizing client device data instances as training data over five time periods (e.g., G1(1), G1(2), G1(3), G1(4), and G1(5)). In some embodiments, the sequential model updates 400 may be utilized as reference model update paths for determining device-level quality assessments for client devices. As shown in FIG. 4, model updates having minimum changes in their update paths (e.g., Group 1 Model Updates 410 and Group 2 Model Updates 420) may represent normal sequential model updates (i.e., noise-free or marginally impacted by corrupted data). Conversely, model updates having moderate to significant changes in their update paths (e.g., Group 3 Model Updates 430 and Group 4 Model Updates 440) may represent abnormal sequential model updates (i.e., noisy or significantly impacted by corrupted data).

Figure 5:
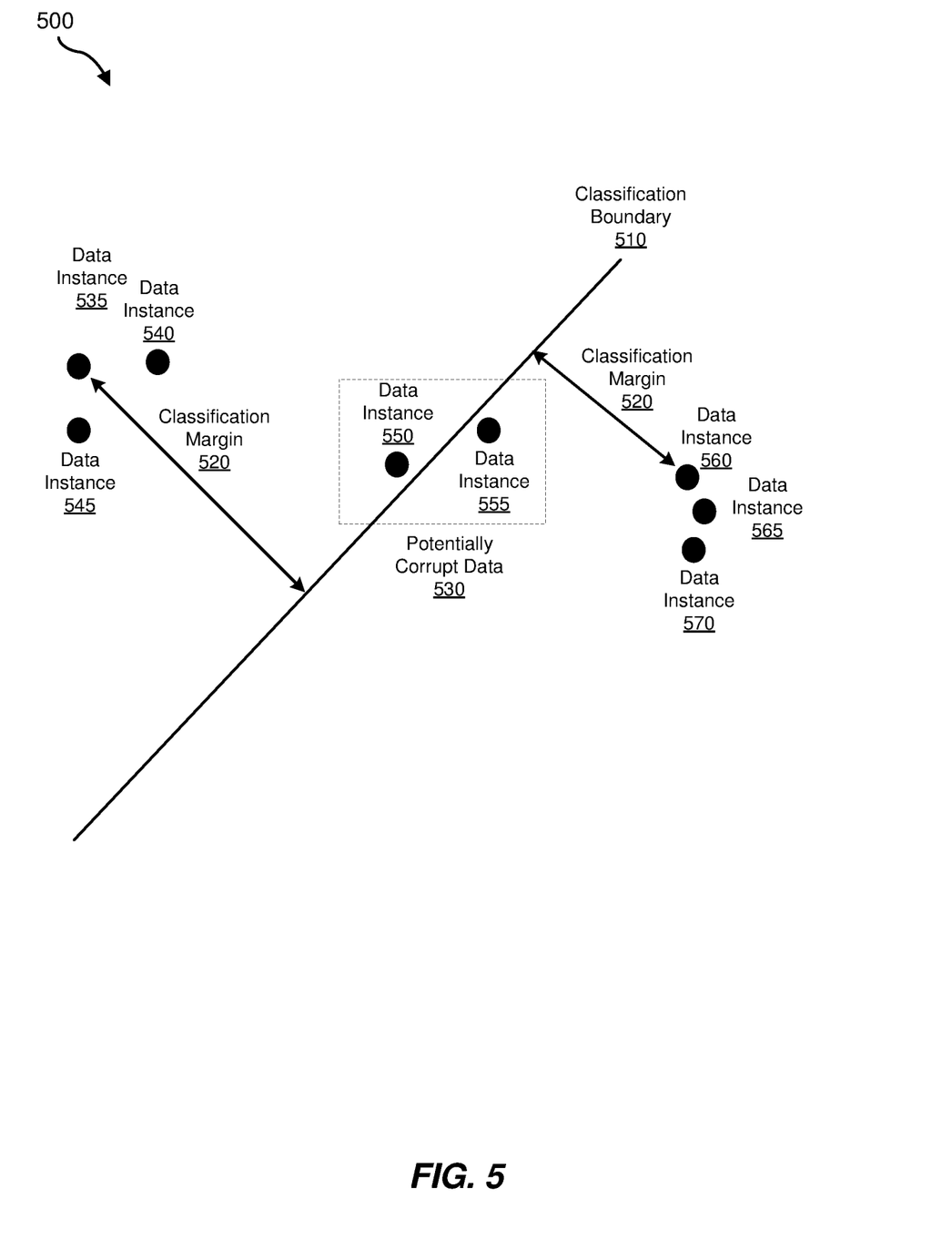
FIG. 5 is a data instance classification diagram illustrating a classification boundary to identify potentially corrupt data instances, that may be utilized by the example systems of FIGS. 1 and 2.

FIG. 5 is a data instance classification diagram 500 illustrating a classification boundary to identify potentially corrupt training data instances, that may be utilized by the example systems of FIGS. 1 and 2. The data instance classification diagram 500 may include a classification boundary 510 and data instances 535, 540, 545, 550, 555, 560, 565, and 570. In some embodiments, data instances having a large classification margin 520 (e.g., those groupings of data instances that are farthest away from either side of classification boundary 510) may be identified as likely to contain noise-free data. For example, the grouping containing data instances 535, 540, and 545 and having a large classification margin 520 with respect to the left side of classification boundary 510, may be identified as clean data instances. Similarly, the grouping containing data instances 560, 565, and 570 and having a large classification margin 520 with respect to the right side of classification boundary 510, may be also identified as clean data instances. Conversely, the grouping containing data instances 550 and 565 having a small classification margin 520 with respect to either side of classification boundary 510, may be identified as potentially corrupt data 530.

As explained in connection with method 300 above, the systems and methods described herein provide for utilizing federated machine-learning to protect against potentially malicious data. By providing a framework for automatic data quality assessment of local data sets hosted on client computing devices, the systems described herein may provide: (1) a device-level quality assessment (as a device quality score) by evaluating the quality of a data set provided by any client computing device and adjusting the weight of the local data sets for training a federated machine-learning model and (2) instance-level data debugging (as an instance quality score) by flagging potentially corrupt data instances hosted on client computing devices. By providing the automatic data quality assessment in this way, the federated training of machine-learning based analytical models may be made robust against local data corruption on client computing devices.

Figure 6:
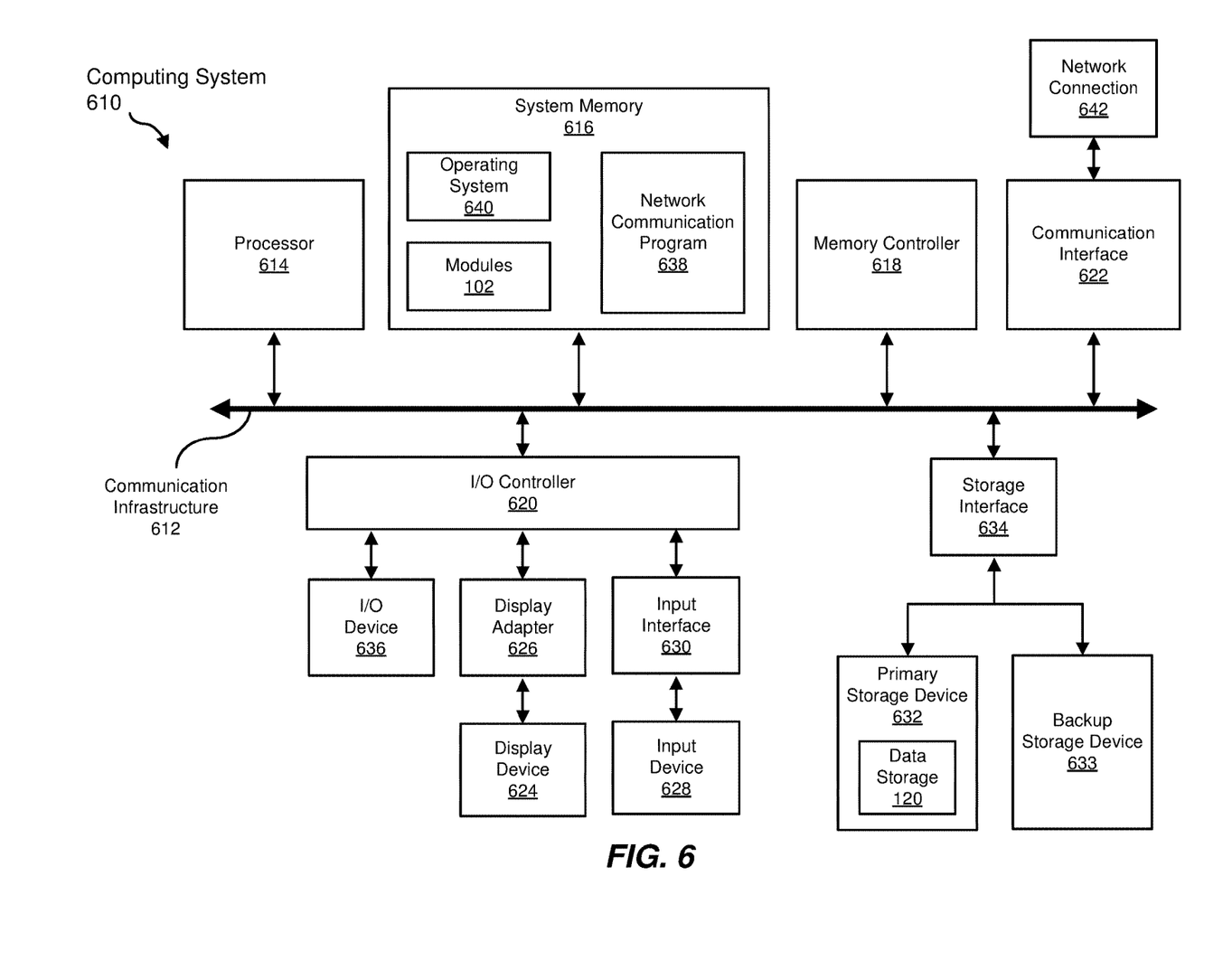
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
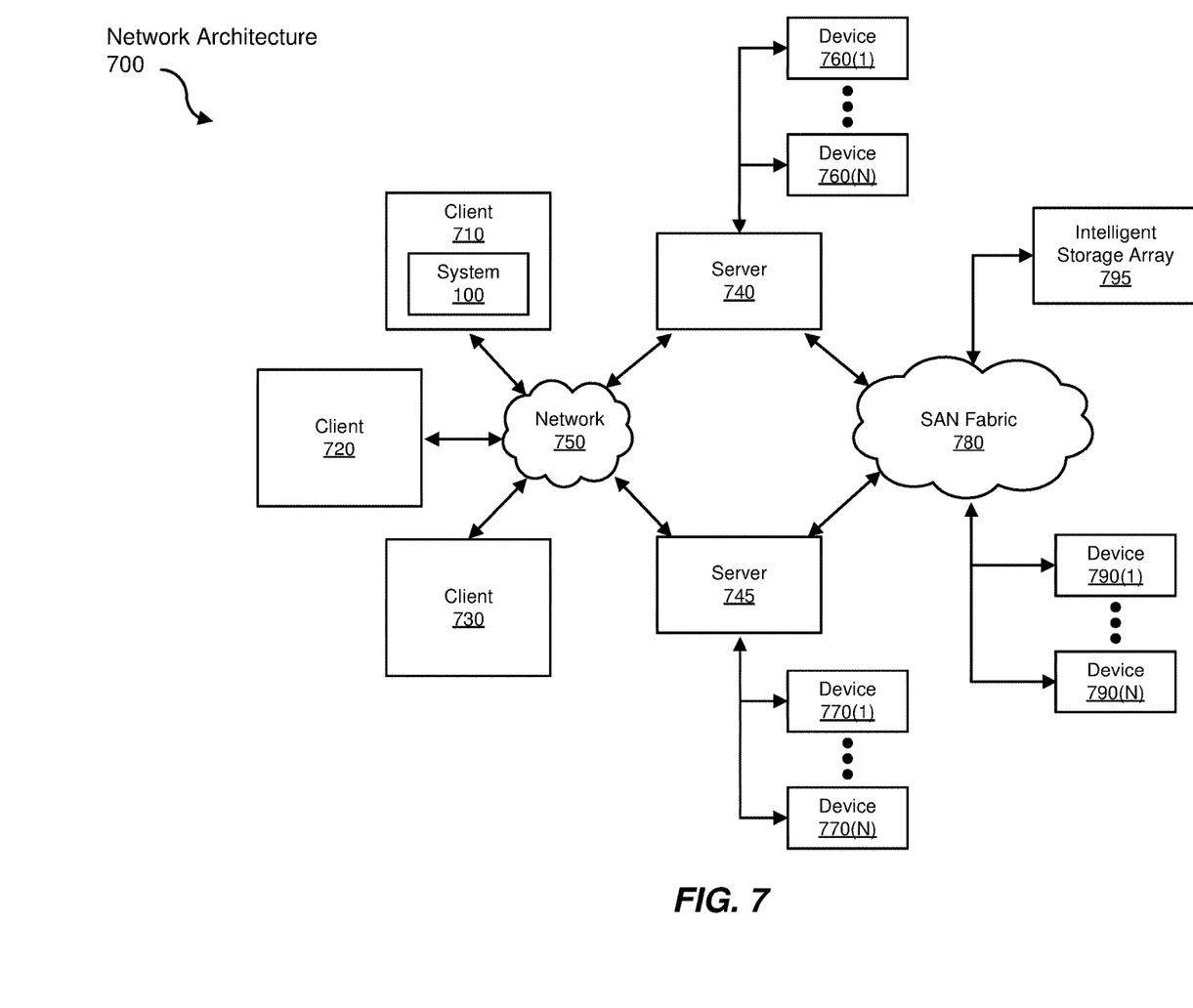
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing federated machine-learning to protect against potentially malicious data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing federated machine-learning to protect against potentially malicious data, at least a portion of the method being performed by one or more computing devices comprising at least one processor, the method comprising:

arranging, by the one or more computing devices, a plurality of client devices into groups for applying a federated machine-learning model;

determining, by the one or more computing devices, model updates for each of the groups over a predetermined period;

training, by the one or more computing devices, one or more recurrent neural networks to derive a low-dimensional representation of the model updates;

calculating, by the one or more computing devices, a data quality score for each of the client devices based on the model updates, wherein the model updates comprise a plurality of sequential model updates over a plurality of consecutive time periods, wherein the sequential model updates are utilized as reference model update paths for determining device level quality assessments for the each of the client devices, the data quality score comprising a measurement indicating a presence of noisy data associated with the client devices when a change in a set of the reference model update paths in at least one group of the sequential model updates differs from another set of the reference model update paths in at least one other group of the sequential model updates, the at least one other group of the sequential model updates representing normal sequential updates corresponding to noise-free data and corrupted data having a marginal impact;

applying, by the one or more computing devices, the federated machine-learning model to classify data instances on each of the client devices as comprising at least one of clean data and potentially corrupt data, wherein applying the federated machine-learning model to classify data instances comprises applying the federated machine-learning model to determine a classification margin value for each of the data instances with respect to a classification boundary, wherein each of a plurality of the data instances that are farthest away from either of a left side and a right side of the classification boundary are identified as clean data instances and wherein each of a plurality of the data instances that are closest to either of the left side and the right side of the classification boundary are identified as potentially corrupt data instances; and performing, by the one or more computing devices, a security action that protects against the potentially malicious data by tagging the data instances classified as the potentially corrupt data.

2. The computer-implemented method of claim 1, wherein calculating the data quality score further comprises determining a probabilistic score for each of the client devices.

3. The computer-implemented method of claim 2, wherein the probabilistic score is determined to have a high value when noise free data is associated with the client devices.

4. The computer-implemented method of claim 2, wherein the probabilistic score is determined to have a low value when noise free data is associated with the client devices.

5. The computer-implemented method of claim 2, further comprising:
correcting the model updates by a reweighed average.

6. The computer-implemented method of claim 1, further comprising determining an instance quality score for each of the data instances based on the classification margin value.

7. The computer-implemented method of claim 1, wherein a low classification margin value is associated with a high likelihood of a target data instance containing the potentially corrupt data.

8. The computer-implemented method of claim 1, wherein a high classification margin value is associated with a low likelihood of a target data instance containing the potentially corrupt data.

9. The computer-implemented method of claim 1, wherein each of the data instances comprises a training instance for the federated machine-learning model.

10. A system for utilizing federated machine-learning to protect against potentially malicious data, the system comprising:
at least one physical processor;
physical memory comprising computer-executable instructions and one or more modules that, when executed by the physical processor, cause the physical processor to:
arrange, by a grouping module, a plurality of client devices into groups for applying a federated machine-learning model;
determine, by a determining module, model updates for each of the groups over a predetermined period;
train, by a training module, one or more recurrent neural networks to derive a low-dimensional representation of the model updates;
calculate, by a scoring module, a data quality score for each of the client devices based on the model updates, wherein the model updates comprise a plurality of sequential model updates over a plurality of consecutive time periods, wherein the sequential model updates are utilized as reference model update paths for determining device level quality assessments for the each of the client devices, the data quality score comprising a measurement indicating a presence of noisy data associated with the client devices when a change in a set of the reference model update paths in at least one group of the sequential model updates differs from another set of the reference model update paths in at least one other group of the sequential model updates, the at least one other group of the sequential model updates representing normal sequential updates corresponding to noise-free data and corrupted data having a marginal impact;

apply, by a classification module, the federated machine-learning model to classify data instances on each of the client devices as comprising at least one of clean data and potentially corrupt data, wherein the classification module applies the federated machine-learning model to classify data instances by applying the federated machine-learning model to determine a classification margin value for each of the data instances with respect to a classification boundary, wherein each of a plurality of the data instances that are farthest away from either of a left side and a right side of the classification boundary are identified as clean data instances and wherein each of a plurality of the data instances that are closest to either of the left side and the right side of the classification boundary are identified as potentially corrupt data instances; and perform, by a security module, a security action that protects against the potentially malicious data by tagging the data instances classified as the potentially corrupt data.

11. The system of claim 10, wherein the scoring module further calculates the data quality score by determining a probabilistic score for each of the client devices.

12. The system of claim 11, wherein the probabilistic score is determined to have a high value when the noisy data is associated with the client devices.

13. The system of claim 11, wherein the probabilistic score is determined to have a low value when noise free data is associated with the client devices.

14. The system of claim 11, wherein the scoring module further calculates the data quality score by:
correcting the model updates by a reweighed average.

15. The system of claim 10, wherein the classification module further applies the federated machine-learning model to classify data instances by determining an instance quality score for each of the data instances based on the classification margin value.

16. The system of claim 10, wherein a low classification margin value is associated with a high likelihood of a target data instance containing the potentially corrupt data.

17. The system of claim 10, wherein a high classification margin value is associated with a low likelihood of a target data instance containing the potentially corrupt data.

18. A non-transitory computer-readable medium comprising one or more computer-executable instructions that, when executed by at least one processor of a computing device, cause the computing device to:
arrange a plurality of client devices into groups for applying a federated machine-learning model;
determine model updates for each of the groups over a predetermined period;
train one or more recurrent neural networks to derive a low-dimensional representation of the model updates;

calculate a data quality score for each of the client devices based on the model updates, wherein the model updates comprise a plurality of sequential model updates over a plurality of consecutive time periods, wherein the sequential model updates are utilized as reference model update paths for determining device level quality assessments for the each of the client devices, the data quality score comprising a measurement indicating a presence of noisy data associated with the client devices when a change in a set of the reference model update paths in at least one group of the sequential model updates differs from another set of the reference model update paths in at least one other group of the sequential model updates, the at least one other group of the sequential model updates representing normal sequential updates corresponding to noise-free data and corrupted data having a marginal impact;

apply the federated machine-learning model to classify data instances on each of the client devices as comprising at least one of clean data and potentially corrupt data, wherein the federated machine-learning model to classify data instances is applied applying the federated machine-learning model to determine a classification margin value for each of the data instances with respect to a classification boundary, wherein each of a plurality of the data instances that are farthest away from either of a left side and a right side of the classification boundary are identified as clean data instances and wherein each of a plurality of the data instances that are closest to either of the left side and the right side of the classification boundary are identified as potentially corrupt data instances; and perform a security action that protects against potentially malicious data by tagging the data instances classified as the potentially corrupt data.

19. The non-transitory computer-readable medium of claim 18, wherein the one or more computer-executable instructions further cause the computing device to calculate the data quality score by determining a probabilistic score for each of the client devices.

20. The non-transitory computer-readable medium claim 19, wherein the probabilistic score is determined to have a high value when noise free data is associated with the client devices.

* * * * *